United States Patent
Flores et al.

(10) Patent No.: US 9,052,906 B2
(45) Date of Patent: Jun. 9, 2015

(54) MODULARIZED CUSTOMIZATION OF A MODEL IN A MODEL DRIVEN DEVELOPMENT ENVIRONMENT

(75) Inventors: Michael Flores, El Paso, TX (US); Leonard S. Hand, Red Creek, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/470,273

(22) Filed: May 12, 2012

(65) Prior Publication Data

US 2013/0305213 A1   Nov. 14, 2013

(51) Int. Cl.
*G06F 9/44* (2006.01)

(52) U.S. Cl.
CPC ........................ *G06F 8/35* (2013.01)

(58) Field of Classification Search
USPC ......... 717/109, 168, 169, 170, 171, 172, 173, 717/174, 175, 176, 177, 178, 101–104; 705/34; 707/3
See application file for complete search history.

(56) References Cited

U.S. PATENT DOCUMENTS

| | | | |
|---|---|---|---|
| 7,770,151 B2 * | 8/2010 | Sanjar et al. | 717/109 |
| 2004/0002907 A1 * | 1/2004 | Tosswill | 705/34 |
| 2006/0064667 A1 * | 3/2006 | Freitas | 717/104 |
| 2006/0129974 A1 | 6/2006 | Brendle et al. | |
| 2006/0200799 A1 | 9/2006 | Wills et al. | |
| 2007/0226186 A1 * | 9/2007 | Ewen et al. | 707/3 |
| 2007/0239717 A1 | 10/2007 | Thrash et al. | |
| 2008/0082959 A1 * | 4/2008 | Fowler | 717/104 |
| 2011/0029673 A1 | 2/2011 | Jaisinghani | |

* cited by examiner

*Primary Examiner* — Chat Do
*Assistant Examiner* — Jae Jeon
(74) *Attorney, Agent, or Firm* — Steven M. Greenberg, Esq.; CRGO LAW

(57) ABSTRACT

A method for the modularized customization of a model within a model driven development environment includes selecting a template specifying a base model and different points of variability of a base model in a model driven development environment and transmitting over a data communications network an electronic form configured to receive data in different data fields representative of the points of variability. Thereafter, a submission of the electronic form can be received and data from the received submission representative of the points of variability can be extracted. Instructions can be added to a control file corresponding to the points of variability and the control file can be processed to generate artifacts in an import file specifying the points of variability. Finally, the import file can be imported into the model driven development environment and the base model modified with the points of variability of the artifacts.

15 Claims, 2 Drawing Sheets

MODULARIZED CUSTOMIZATION OF A MODEL IN A MODEL DRIVEN DEVELOPMENT ENVIRONMENT

BACKGROUND OF THE INVENTION

1. Field of the Invention

The present invention relates to model driven development and particularly to model generation of a systems architecture.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, architected, implemented and evolved. Model-driven development (MDD) represents one such software development strategy in which models are the primary artifacts of software development. As used herein, a "model" refers to a collection of information having a well-defined containment hierarchy.

Modeling complex applications has several general benefits which can include a better understanding of the business or engineering situation at hand, the construction and design of a systems architecture, and the creation of visualizations of code and other forms of implementation. Although some may argue that application visualization alone does not constitute a model, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created from a methodological process that often begins with application requirements and culminates with a high-level architectural design model. Developers can create a detailed design model from which skeletal code can be generated to an integrated development environment. The integrated development environment, in turn, can be used to complete the detailed coding. Any changes to the code that affect the design model can be synchronized back into the model. Likewise, any model changes can be synchronized into the existing code.

The value of model based architecture is apparent to all knowledgeable in the field. However, there remains a challenge with the model based approach in that the model based approach requires substantial knowledge, time, and effort to populate the model. Those familiar with the modeling tools understand the power of model driven development tools as well as the effort required to create a solution model in a model driven development tool. Thus, the challenge is to bridge the gap between model data entry to model value. Traditional methods involve backing up all or part of an existing model and restoring to another model—essentially a model-to-model transformation. These cases are often specific to the solution space to which the cases address and have limited use as they only fit a finite set of reuse criteria. Likewise, generic models oftentimes are too broad and require substantial deletion and find grained adjustment to be practical.

BRIEF SUMMARY OF THE INVENTION

Embodiments of the present invention address deficiencies of the art in respect to model driven development and provide a novel and non-obvious method, system and computer program product for the modularized customization of a model within a model driven development environment. In an embodiment of the invention, a method for the modularized customization of a model within a model driven development environment is provided. The method includes selecting a template specifying a base model and different points of variability of the base model in a model driven development environment and transmitting over a data communications network an electronic form configured to receive data in different data fields representative of the points of variability. Thereafter, a submission of the electronic form can be received from over the data communications network and data from the received submission representative of the points of variability can be extracted. Instructions can be added to a control file corresponding to the points of variability and the control file can be processed to generate artifacts in an import file for the model driven development environment, the artifacts specifying the points of variability. Finally, the import file can be imported into the model driven development environment and the base model modified with the points of variability of the artifacts.

In another embodiment, a model driven development data processing system is provided. The system can include at least one host server that includes at least one processor and memory. A repository of base models can be coupled to the host server or servers and a model driven development tool can execute in the memory of the host server or servers and configured to transform a base model in the repository according to points of variability specified in an import file. Yet further, a forms processor can be coupled to a Web server and configured to extract from a submission in response to an electronic form received in the Web server, different points of variability to a base model in the repository, and to add instructions to a control file corresponding to the points of variability. Finally, a control file engine can be coupled to the model driven development tool. The engine can include program code enabled upon execution in the memory of the at least one host server to process the control file to generate artifacts in an import file specifying the points of variability.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for the modularized customization of a model within a model driven development environment. In accordance with an embodiment of the invention, an electronic form can be presented in a content browser and model information representative of points of variability of a base model defined by a template can be received in the electronic form. The model information can include model data such as actors, entities and services. The model information in turn can be placed in a control file specifying instructions for generating extensible markup language (XML) artifacts representative of the points of variability into an import file to be used to customize the base model in a model-to-model transformation. Thereafter, the import file can be generated from the control file and imported into a model driven development tool from which a specified base model can be transformed to account for the points of variability.

Figure 1:
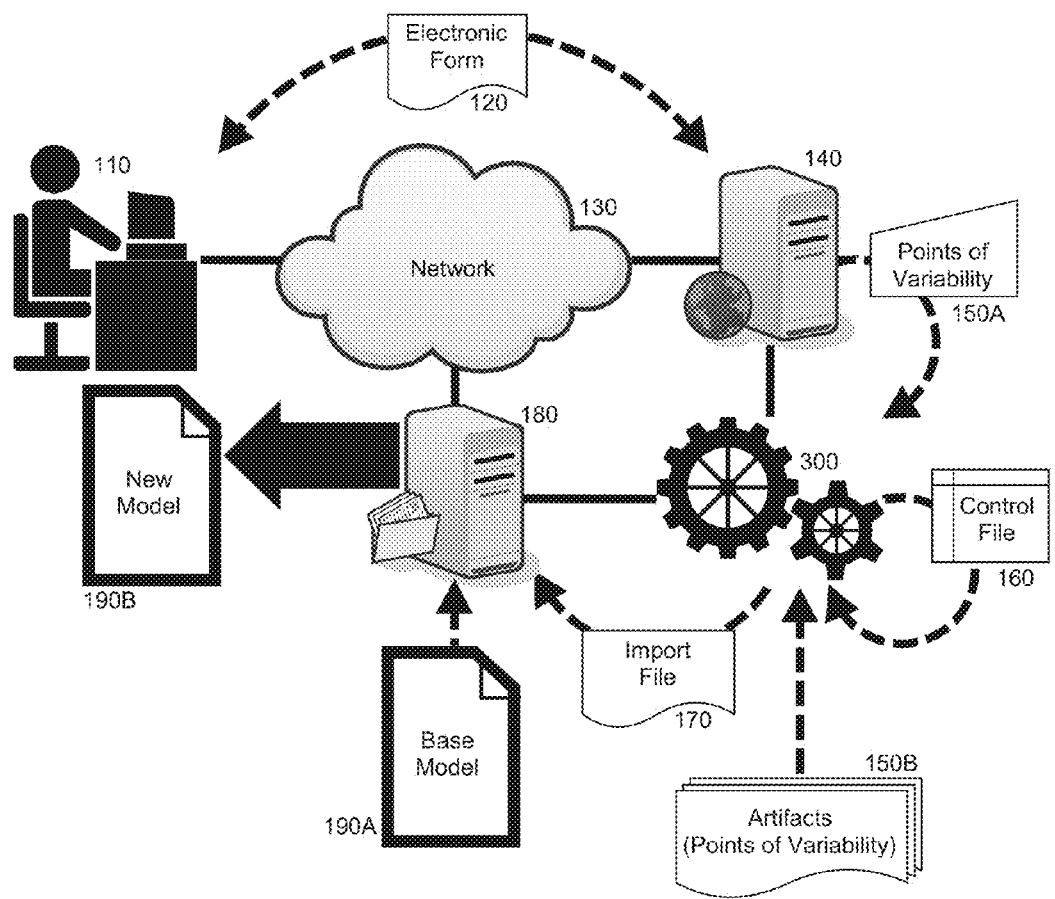
FIG. 1 is a pictorial illustration of a process for the modularized customization of a model within a model driven development environment.

In further illustration, FIG. 1 pictorially shows a process for the modularized customization of a model within a model driven development environment. As shown in FIG. 1, an end user 110 can complete an electronic form 120 with different user interface controls permitting entry of data corresponding to different points of variability 150A of a selected base model 190A set forth in a template (not shown). The electronic form 120 can be submitted over computer communications network 130 to a content server 140 and the data corresponding to the points of variability 150A can be extracted from the electronic form 120.

Modularized model customization logic 300 can process the points of variability 150A into a control file 160 which can include different code instructions referencing different artifacts 150B representative of the points of variability 150A. Thereafter, the modularized model customization logic 300 can process the control file 160 into an import file 170 and the import file 170 can be provided to a model driven development tool 180. The model driven development tool 180 in turn can apply the points of variability 150A represented in the artifacts 150B of the import file 170 to the base model 190A in order to produce a new model 190B.

Figure 2:
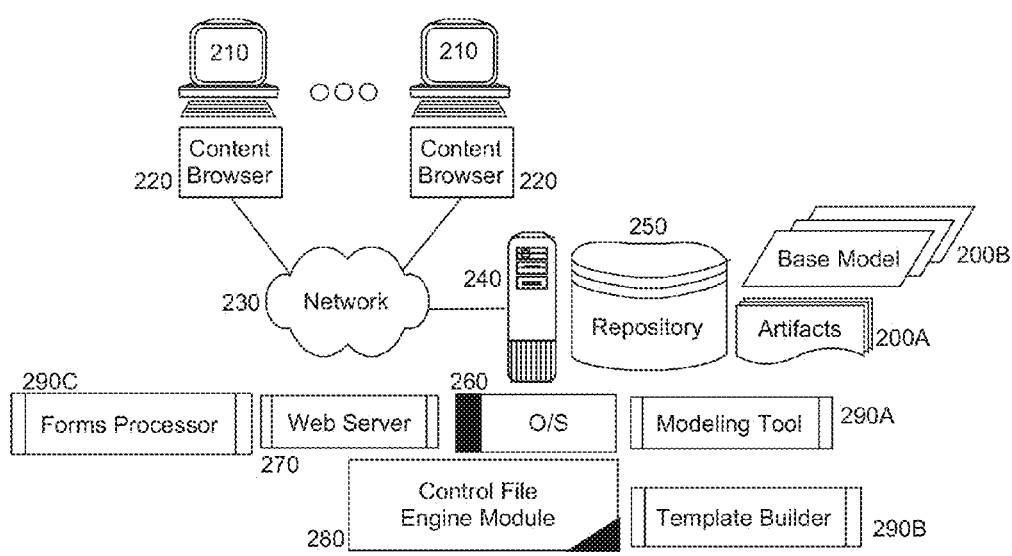
FIG. 2 is a schematic illustration of a model driven development data processing system configured for the modularized customization of a model; and, FIG. 3 is a flow chart illustrating a process for the modularized customization of a model within a model driven development environment.

The process described in connection with FIG. 1 can be implemented within a model driven development data processing system. In yet further illustration, FIG. 2 schematically shows a model driven development data processing system configured for the modularized customization of a model. The system can include one or more host servers 240 communicatively coupled to different client computers 210 over computer communications network 230 (only a single host server shown for the purpose of illustrative simplicity).

An operating system 260 can execute in the host server 240 and can host the operation of a modeling tool 290A. The modeling tool 290A can provide an interface through which different base models 200B can be developed, stored in a repository 250 and maintained in a model driven development environment provided by the modeling tool 290A. The host server 240 also can host the operation of a Web server 270 providing different forms in different Web pages including different forms defined within the pages over the computer communications network 230 for viewing in respective content browsers 220. The forms can include different user interface controls corresponding to selections for corresponding points of variability specified within different templates defined for different ones of the base models 200B.

In this regard, a template builder 290B can be coupled to the Web server 270 and can be configured to provide an interface through which different templates can be defined in association with a selected base model 200B. As part of the definition of a template, the template builder 290B can be configured to define a base model, architectural objects for the model, and descriptions of the objects. The template additionally can include different points of variability for model elements of the selected base model 200B. Finally, a forms processor 290C can be provided and configured to extract data from completed forms received from the content browsers 220 by Web server 270. Yet further, the forms processor 290C can be configured to process data extracted from a submitted form. Specifically, the forms processor 290C can receive the data which is representative of points of variability of a selected one of the base models 200B.

Upon receipt, the program code of the control file engine module 280 can map the points of variability to different XML artifacts 200A. Each of the artifacts 200A can include XML compliant markup configured to apply one or more changes to the selected one of the base models 200B reflective of a corresponding one of the points of variability. Thereafter, the forms processor 290C can add instructions to a control file corresponding to the mapped ones of the artifacts 200A, Finally, a control file engine module 280 can be coupled to the modeling tool 290A. The control file engine module 280 can include program code enabled upon execution in the memory of the host server 240 to process the control file to place the mapped artifacts 200A into an import file specifying the points of variability. Thereafter, the import file can be imported into the modeling tool 290A for use by the modeling tool 290A in modifying the selected one of the base models 200B with the points of variability of the artifacts 200A.

Figure 3:
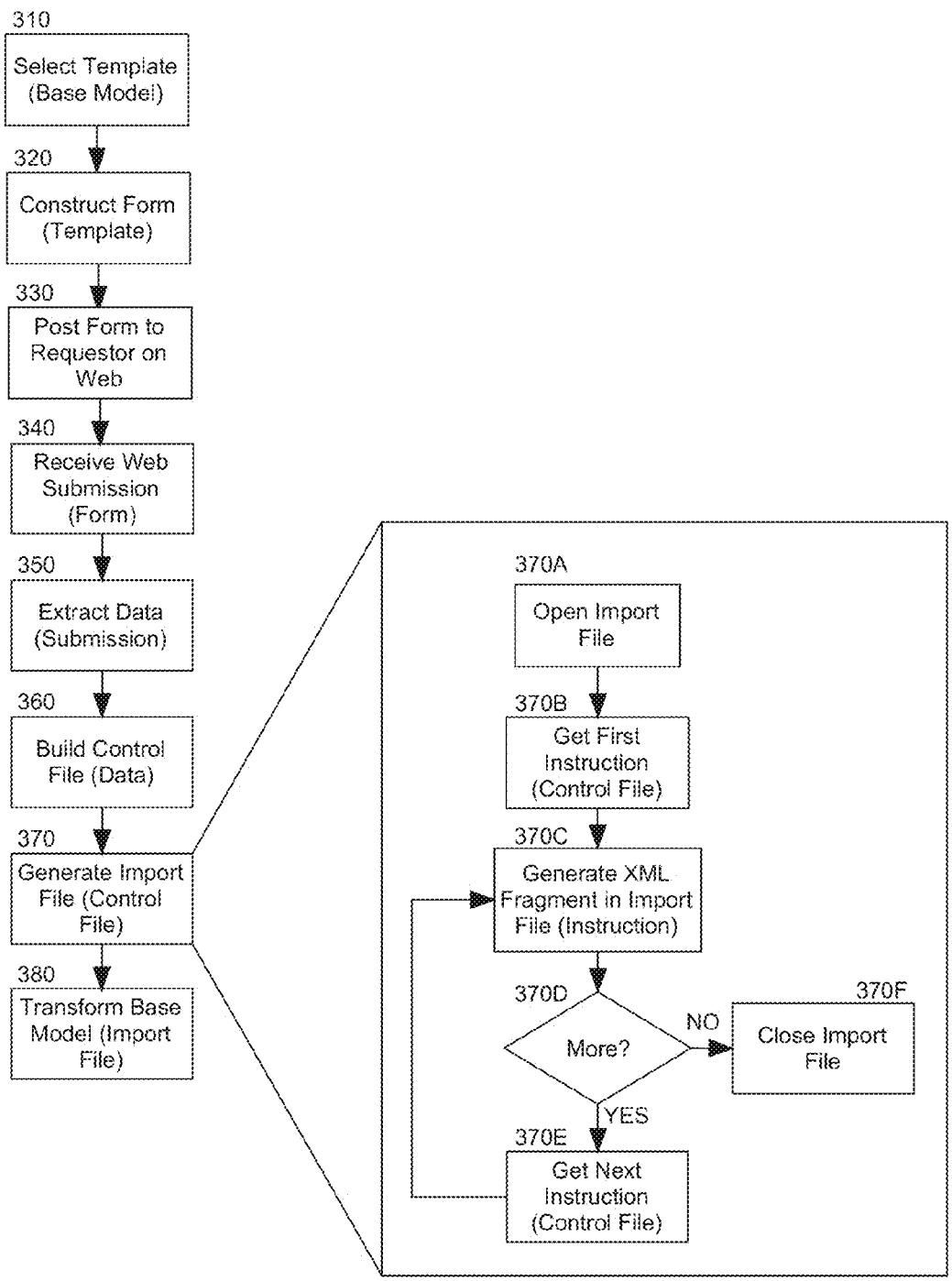

In even yet further illustration of the operation of the control file engine module 280, FIG. 3 is a flow chart illustrating a process for the modularized customization of a model within a model driven development environment. Beginning in block 310, a template can be selected for a base model for customization in a model driven development environment. In block 320, a Web form including different user interface controls through which points of variability of the selected template can be generated, and in block 330, the generated form can be transmitted to a requesting end user.

In block 340, a Web submission can be received in response to the completion of the Web form in which different user interface controls of the Web form provide for the specification of values for points of variability of the selected base model. In block 350, data can be extracted from the form representative of the points of variability and in block 360, a control file can be constructed to include instructions pertaining to the incorporation of artifacts in an import file to a modeling tool, each artifact corresponding to a different one of the points of variability, such as a specific actor, entity or service.

In this regard, the control file can include a sequence of instructions pertaining to the incorporation of different artifacts into an import file, the artifacts corresponding to respectively different ones of the points of variability. In one aspect of the embodiment, the control file has the format of [verb/action] * [variable] * [data]. Exemplary verbs include NOP—No operation, specifies that the following line is for logging purposes only SUB—XML substitution, specifies that the data value will be used to substitute all incidences of the variable in the import file ADD—XML addition, specifies that the XML file with the name data is to be added to the import file SAD—XML substitution and addition, specifies that the XML file named after the variable name is to be added to the import file and that the data value is to replace all incidences of variable within the XML DSTART—XML diagram start, specifies that the line signifies the start of a diagram, contained in data.XML. Opens said diagram for addition of objects.

DADD—XML diagram addition, specifies that a object of type variable will be added to the current diagram.

DEND—XML diagram end, specifies that the current diagram has all its objects, and closes it.

In block 370, the control file can be processed to produce the import file. For instance, in step 370A an import file can be opened and in block 370B a first instruction in the control file can be retrieved. In block 370C an XML fragment corresponding to a point of variability can be placed into the import file according to the first instruction for instructions pertaining to the addition of the artifact. In block 370D, it can be determined if additional instructions remain to be processed in the control file. If not the process can end in block 370F. Otherwise, in block 370E a next instruction in the control file can be retrieved and the process can repeat in block 370C.

In block 380, a base model can be modified according to the points of variety specified in the artifacts of the import file upon the selection of a base model in the modeling tool. The base model can be represented within one or more tables of a database such that the different records of the table can represent different elements of the base model. Specifically, various fields of records of the table corresponding to elements in the base model can be modified with data represented in the points of variability so as to produce a new model from the base model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embobiments thereof, it will be apparent that modifications and variations are possible without departing from the scope of the invention defined in the appended claims as follows:

1. A method for the modularized customization of a model within a model driven development environment, the method comprising:
    selecting a template specifying a base model and different points of variability of the base model in a model driven development environment;
    transmitting over a data communications network an electronic form configured to receive data in different data fields representative of the points of variability of the base model in the model driven development environment;
    receiving a submission of the electronic form from over the data communications network and extracting data from the received submission representative of the points of variability;
    adding instructions to a control file corresponding to the points of variability, the instructions pertaining to the incorporation of artifacts into an import file;
    processing the control file according to the instructions in the control file to generate artifacts in the import file for the model driven development environment, each artifact corresponding to a different one of the points of variability; and,
    importing the import file into the model driven development environment and modifying the base model with the points of variability of the artifacts specified in the import file, where various fields of records of a table corresponding to elements in the base model are modified with data represented in the points of variability so as to produce a new model from the base model.

2. The method of claim 1, wherein the electronic form is a Web based form.

3. The method of claim 1, wherein the points of variability comprise specific actors, entities and services to be added to the base model.

4. The method of claim 1, wherein the artifacts are specified according to the extensible markup language (XML).

5. The method of claim 1, wherein the instructions of the control file comprise instructions selected from the group consisting of adding content from a specified XML file, substituting an existing variable value in the control file with a specified value, and both adding content from a specified XML file and also substituting an existing variable value in the control file with a specified value.

6. A model driven development data processing system comprising:
    at least one host server comprising at least one processor and memory;
    a repository of base models coupled to the at least one host server;
    a model driven development tool executing in the memory of the at least one host server and configured to select a template specifying a base model and different points of variability of the base model, transmit over a Web server an electronic form configured to receive data in different data fields representative of the points of variability of the base model, import an import file into the model driven development environment and transform a base model in the repository according to the points of variability of artifacts specified in the import file, where various fields of records of a table corresponding to elements in the base model are modified with data represented in the points of variability so as to produce a new model from the base model;
    a forms processor coupled to the Web server and configured to extract from a submission in response to the electronic form received in the Web server, the different points of variability to the base model in the repository, and to add instructions to a control file corresponding to the points of variability, the instructions pertaining to the incorporation of artifacts into the import file; and,
    a control file engine coupled to the model driven development tool, the engine comprising program code enabled upon execution in the memory of the at least one host server to process the control file according to the instructions in the control file to generate artifacts in the import file for the model driven development tool, each artifact corresponding to a different one of the points of variability.

7. The system of claim 6, wherein the electronic form is a Web based form.

8. The system of claim 6, wherein the points of variability comprise specific actors, entities and services to be added to the base model.

9. The system of claim 6, wherein the artifacts are specified according to the extensible markup language (XML).

10. The system of claim 6, wherein the instructions of the control file comprise instructions selected from the group consisting of adding content from a specified XML file, substituting an existing variable value in the control file with a specified value, and both adding content from a specified XML file and also substituting an existing variable value in the control file with a specified value.

11. A computer program product for modularized customization of a model within a model driven development environment, the computer program product comprising:

a computer readable storage medium having computer readable program code embodied therewith, the computer readable program code comprising:

computer readable program code for selecting a template specifying a base model and different points of variability of the base model in a model driven development environment;

computer readable program code for transmitting over a data communications network an electronic form configured to receive data in different data fields representative of the points of variability of the base model in the model driven development environment;

computer readable program code for receiving a submission of the electronic form from over the data communications network and extracting data from the received submission representative of the points of variability;

computer readable program code for adding instructions to a control file corresponding to the points of variability, the instructions pertaining to the incorporation of artifacts into an import file;

computer readable program code for processing the control file according to the instructions in the control file to generate artifacts in the import file for the model driven development environment, each artifact correspond to a different one of the points of variability; and, computer readable program code for importing the import file into the model driven development environment and modifying the base model with the points of variability of the artifacts specified in the import file, where various fields of records of a table corresponding to elements in the base model are modified with data represented in the points of variability so as to produce a new model from the base model.

12. The computer program product of claim 11, wherein the electronic form is a Web based form.

13. The computer program product of claim 11, wherein the points of variability comprise specific actors, entities and services to be added to the base model.

14. The computer program product of claim 11, wherein the artifacts are specified according to the extensible markup language (XML).

15. The computer program product of claim 11, wherein the instructions of the control file comprise instructions selected from the group consisting of adding content from a specified XML file, substituting an existing variable value in the control file with a specified value, and both adding content from a specified XML file and also substituting an existing variable value in the control file with a specified value.

\* \* \* \* \*